March 18, 1924.

R. N. DICKEY

FLOUR SIFTER

Filed May 28, 1923

1,487,216

INVENTOR
ROY N. DICKEY
BY
Richard J. Cook
ATTORNEY

Patented Mar. 18, 1924.

1,487,216

UNITED STATES PATENT OFFICE.

ROY N. DICKEY, OF SEATTLE, WASHINGTON, ASSIGNOR, BY DIRECT AND MESNE ASSIGNMENTS, TO MEETS-A-NEED MANUFACTURING CO., A CORPORATION.

FLOUR SIFTER.

Application filed May 28, 1923. Serial No. 642,124.

*To all whom it may concern:*

Be it known that I, ROY N. DICKEY, a citizen of the United States, and a resident of Seattle, King County, Washington, have invented certain new and useful Improvements in Flour Sifters, of which the following is a specification.

This invention relates to improvements in sifting devices, and more particularly to devices for sifting flour; the principal object of the invention being to provide a device for that purpose that may be operated by the same hand in which it is held so that the other hand will be left for any other use.

Another object of the invention is to provide a device of the above character having a plurality of sifting screens, through which the flour is required to pass in order that it may be reduced to a desired degree of fineness without necessitating a double sifting operation. Also to provide for the removal of siftings from between the screens through an opening in the sifter casing.

A still further object of the invention is to provide agitators that are movably mounted adjacent the upper surfaces of each of the screens, and which are connected for operation by means of a link that extends to a point where it may be actuated by the hand that grips the handle.

In accomplishing these objects I have provided the improved details of construction, the preferred forms of which are illustrated in the accompanying drawings, wherein—

Figure 1:
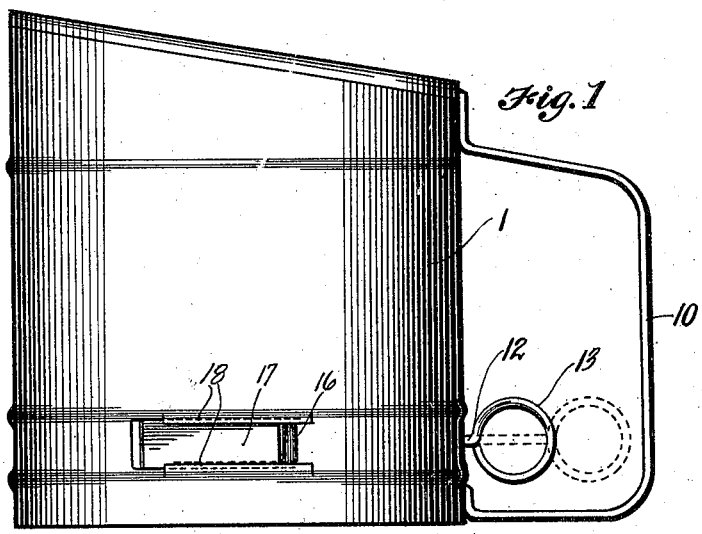
Figure 1 is a perspective view of a flour sifter embodied by the present invention.
Figure 2:
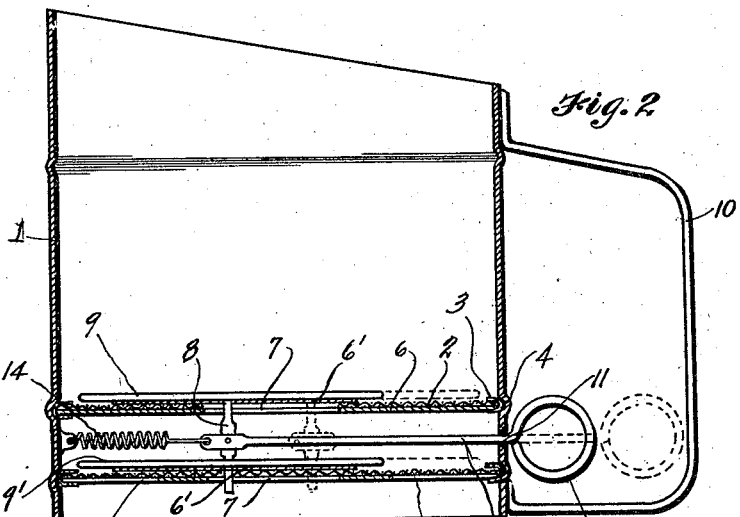
Figure 2 is a central, vertical section of the same illustrating the relation of the sifting screens, the agitators and the operating means therefor.

Referring more in detail to the drawings—

1 designates a sifter casing open at its opposite ends and having sifting screens 2—2′ mounted in parallel spaced apart relation within the lower end. Preferably the screens would be secured about their edges within metal rings 3 that are seated within outwardly pressed annular grooves 4 in the casing walls.

Secured within the casing and extending centrally thereacross just beneath each of the sifting screens, are supporting bars 6, provided with longitudinally directed slots 7 registering with like slots in the screens within which the opposite ends of a vertical shaft 8 are slidably contained; the said shaft being fixed at its opposite ends to agitators 9—9′ that are disposed slidably upon the upper surfaces of the sifting screens 2—2′.

Secured to the casing is a handle 10, and extended through an opening 11 in the casing wall directly within the handle is a wire link 12 that extends between the screens 2—2′ and is fixed at its inner end to the shaft 8. At its outer end it is formed in a loop 13 through which the user may extend one of the fingers of the hand that grips the handle, to operate the link back and forth to reciprocate the agitators upon the screens. The operator pulls outwardly on the loop and a spring 14 fixed to the inner end of the link 12 and to the casing wall, pulls it back.

To prevent flour from sifting through the slots in the screens directly above the slots 7 in cross bars 6, I have provided overlying plates 6′ which are slidable on the screens and through which the shaft 8 extends.

Figure 4:
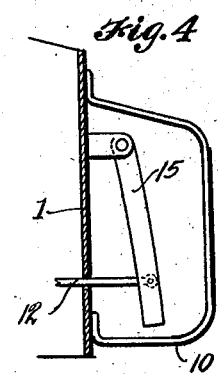
Figure 4 is a detail view, illustrating an alternative construction.
Figure 3:
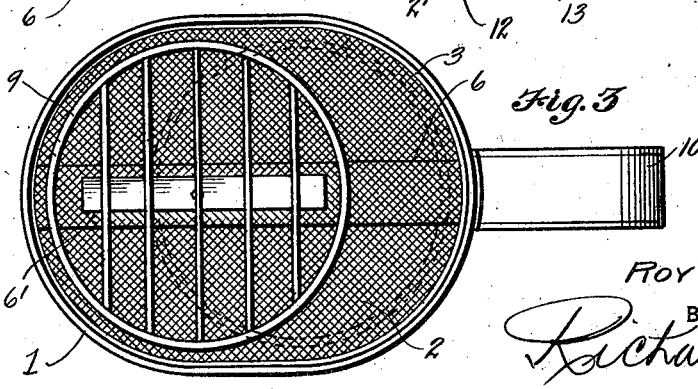
Figure 3 is a top, or plan view of the sifter.

I have illustrated an alternative construction in Figure 4, wherein, a lever 15 is pivotally supported from the casing wall and to its swinging end the outer end of link 12 is pivotally fixed. With this construction the user extends the fingers about the lever and actuates the agitators by pulling the lever outwardly and then releasing it.

While I have illustrated a device comprising two sifting screens, it is readily apparent that more could be provided if so desired, and that agitators for these additional screens could be provided and operated in the same manner as is herein described and illustrated. It is readily apparent also that agitators of various forms could be provided and that they need not be limited to the circular form, as I have shown.

In order that siftings, or foreign matter of any kind, can be removed from between the screens of the sifter, I have provided the casing with an opening 16 at a point between the screens, over which a slide 17 is normally held by means of flanges 18 secured to or bent outwardly from the casing. The slide may be removed to uncover the opening and siftings can be poured from between the screens therethrough.

It will be seen that by the use of a device of this character comprising a plurality of screens, flour may be reduced to a desired degree of fineness without necessitating double sifting. It will also be seen that the device can be held and operated by one hand and that the other hand will be left free for stirring or other uses.

Having thus described my invention, what I claim as new therein and desire to secure by Letters Patent, is:

A flour sifter comprising a casing provided with a handle and having an opening in the wall directly within the handle, a plurality of sifting screens in the casing in spaced relation, supporting bars for the screens having longitudinally extending slots therein, agitators mounted above the screens for reciprocal movement thereon, and a shaft extended through said slots and connecting said agitators, a link slidable through said casing opening fixed at its inner end to said agitator connecting shaft, and having an actuating loop at its outer end, and a spring fixed to the casing and to the said link to yieldingly resist its outward movement.

Signed at Seattle, King County, Washington this 12th day of May 1923.

ROY N. DICKEY.